(12) United States Patent
Song et al.

(10) Patent No.: US 6,542,201 B1
(45) Date of Patent: Apr. 1, 2003

(54) ZOOMING APPARATUS AND METHOD IN DIGITAL TV

(75) Inventors: Seung Chul Song, Seoul (KR); Jin Ho Ahn, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/512,883

(22) Filed: Feb. 25, 2000

(30) Foreign Application Priority Data

Mar. 3, 1999 (KR) .............................................. 99-6984

(51) Int. Cl.[7] .................................................. H04N 5/44
(52) U.S. Cl. .................... 348/561; 348/240.99; 348/581
(58) Field of Search ................................ 348/561, 581, 348/576, 704, 240.99; 345/130, 127; H04N 5/44, 9/74, 5/262

(56) References Cited

U.S. PATENT DOCUMENTS

| | | | | |
|---|---|---|---|---|
| 4,774,581 A | * | 9/1988 | Shiratsuchi | 348/553 |
| 5,243,433 A | * | 9/1993 | Hailey | 348/240 |
| 5,249,049 A | * | 9/1993 | Kranawetter et al. | 348/473 |
| 5,333,055 A | * | 7/1994 | Murata et al. | 348/239 |
| 5,475,426 A | * | 12/1995 | Kinugasa et al. | 348/240 |
| 5,535,007 A | * | 7/1996 | Kim | 358/296 |
| 5,602,870 A | * | 2/1997 | Hailey et al. | 348/240 |
| 5,850,487 A | * | 12/1998 | Takane et al. | 348/240 |
| 5,966,171 A | * | 10/1999 | Hieda | 348/240 |

* cited by examiner

Primary Examiner—John Miller
Assistant Examiner—Trang U. Tran
(74) Attorney, Agent, or Firm—Birch, Stewart Kolasch & Birch, LLP

(57) ABSTRACT

An image zooming apparatus and method for zooming a specific portion of an image in a vertical direction for a digital TV is disclosed. The present apparatus includes a line memory unit for storing the input images; an input data controller for storing the input data in the line memory unit according to a type of the input image and zoom magnification; a zoom controller for receiving zoom area information and zoom magnification from a user, and controlling the data storage in the line memory unit and the processing of the stored data; and data processor for providing a zoomed image according to the control of the zoom controller. The present invention allows a user to zoom an image area of interest and re-zoom a zoomed image area of interest, thereby providing a user-friendly device.

19 Claims, 9 Drawing Sheets

FIG.3
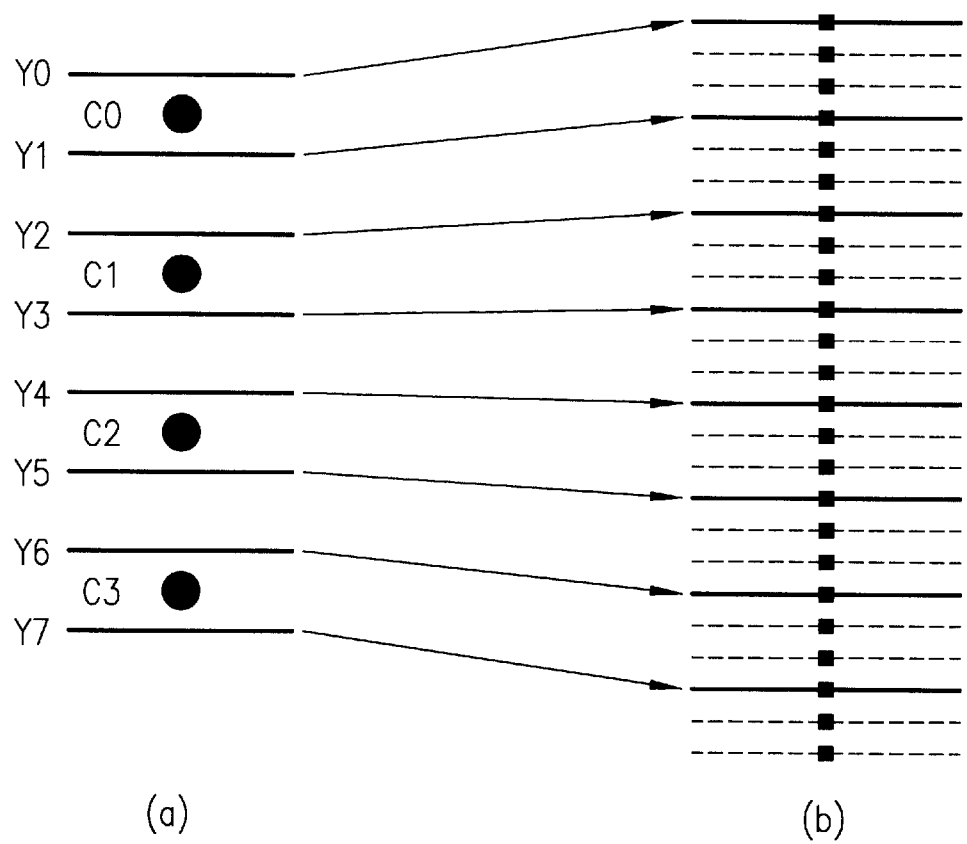
(a)  (b)
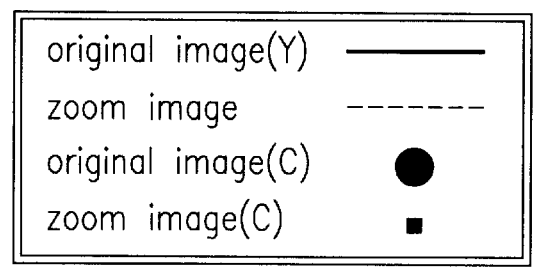

FIG.4
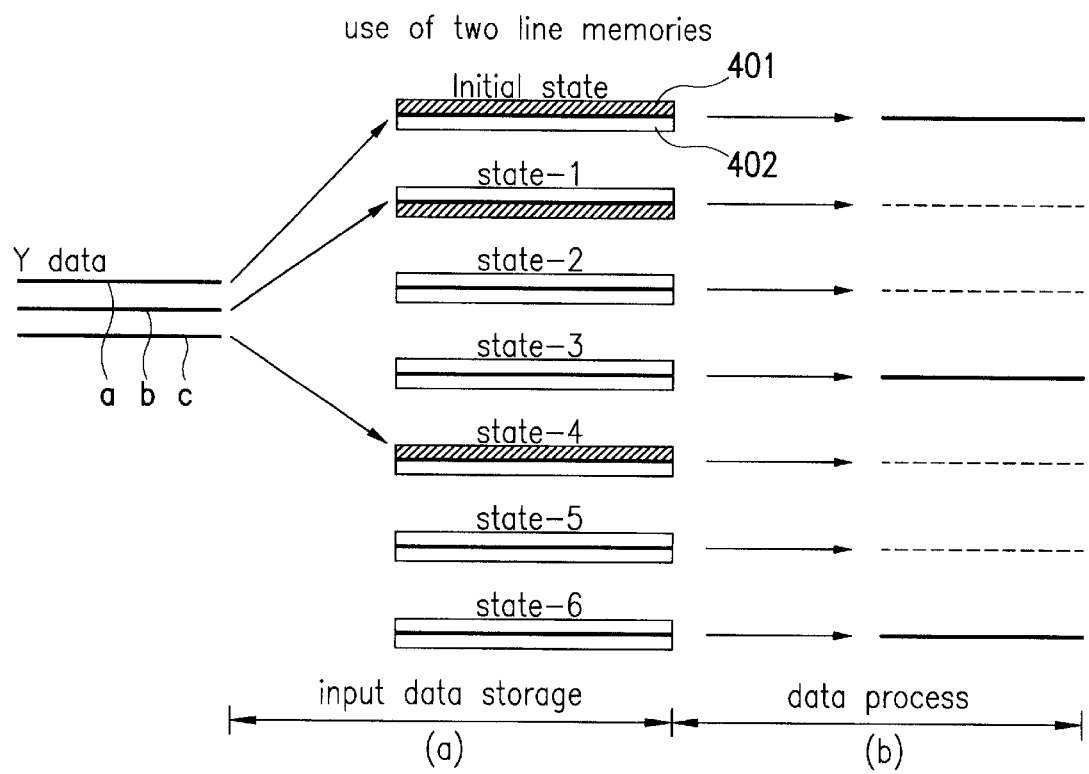
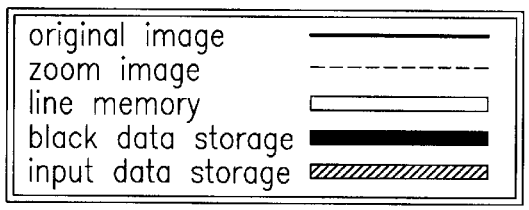

(a)                    (b)

FIG.10
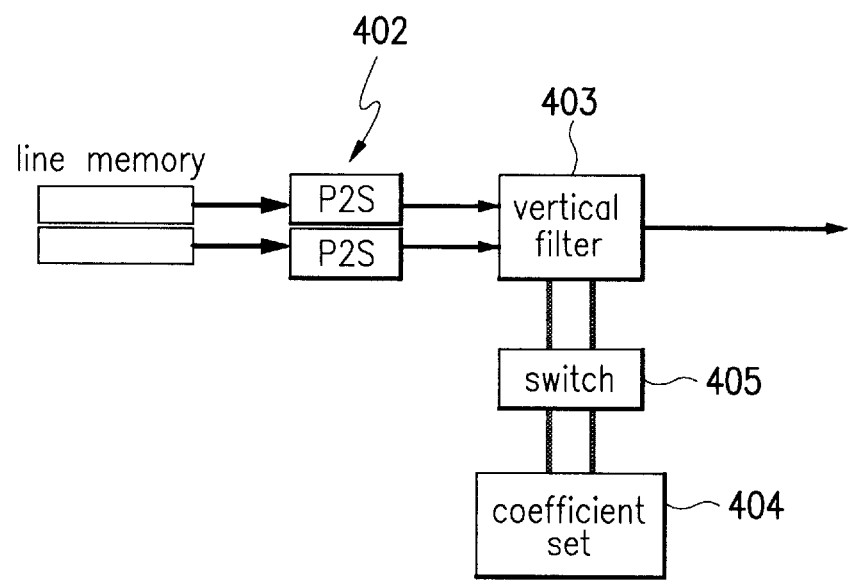
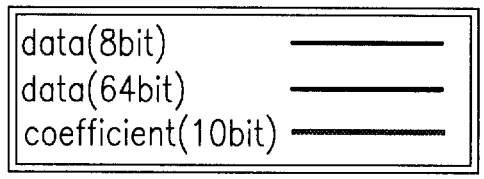

ZOOMING APPARATUS AND METHOD IN DIGITAL TV

BACKGROUND OF THE INVENTION

1. Field of the Invention

The present invention relates to a digital television and more particularly, to an image zooming apparatus of a digital television.

2. Discussion of Related Art

A digital television (DTV) has many functions including functions which had only been available through a computer. Among these functions, a function for zooming to view a portion of a display is also available in analog televisions. In the zoom function of an analog television, an output image is enlarged by controlling the horizontal and vertical of the electron beam emitted from an electron gun of a CRT.

As shown in FIG. 1, a zooming function may be implemented by converting an input signal into a digital signal and by adding a zoom controller and memory. Particularly, a channel tuned in by a tuner 101 is demodulated into a video signal and an audio signal through an audio/video (A/V) processor 102. The demodulated signals are then digitalized in an analog/digital (A/D) converter 103. The digitalized signal is stored in a memory 106 of a zoom processor 104, from which only a signal of a corresponding area is output to an interpolator according to the control of a zoom controller 105. Thereafter, the interpolator 107 interpolates the received signal to a size based upon a zoom magnification, and the magnified signal is stored in a second memory 109. The data stored in the memory 109 is finally output to a display device according to the control of a display controller 108.

Although the analog system as described above allows a function of zooming, the zooming is only available for a particular areas. Also, the magnification is significantly limited. As a result, a user or viewer is restricted in zooming a desired area by various magnifications. An interested area cannot be re-zoomed a multiple times because there is no multi-step zooming function, thereby causing an inconvenience to the user.

SUMMARY OF THE INVENTION

Accordingly, an object of the present invention is to solve at least the problems and disadvantages of the related art.

An object of the present invention is to provide an image zooming apparatus for a digital TV capable of zooming an optional area of an image in a vertical direction.

Another object of the present invention is to provide an image zooming apparatus for a digital TV capable of zooming and displaying an image by various magnifications.

A further object of the present invention is to provide an image zooming apparatus for a digital TV capable of re-zooming a specific area of an image by user manipulation.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, the image zooming apparatus of a digital TV includes a line memory unit for storing the input images by each line; an input data controller for storing the input data in the line memory unit according to a type of the input image and a zoom magnification; a zoom controller for receiving zoom area information and zoom magnification from a user, and controlling the data storage in the line memory unit and the processing of the stored data; and a data processor for outputting a zoomed image from an original image stored in the line memory unit according to the control of the zoom controller.

In the present invention, a method of interpolating a zoom image depends upon the number of line memories. Also, in the input data controller, the luminance (Y) data operates to determine a storing procedure of the line memory according to the magnitude of an input image and the zoom magnification, regardless of the input image type. Moreover, the color (C) data among the input images operates to determine a storing procedure of the line memory according to the magnitude of an input image, the zoom magnification, and a type of the input images and color formats of output images.

Furthermore, in the present invention, a user selects a zooming position and magnification from an output image. The zoom controller then determines a zoom starting position on an original image and a desired input size based upon the selected position and magnification. Finally, the zoom controller performs a control operation such that $1/(n^2)$ size of the original image may be zoomed to a size of the output image, where the width and length are respectively zoomed by an n magnification and where n is a natural number.

BRIEF DESCRIPTION OF THE ATTACHED DRAWINGS

The invention will be described in detail with reference to the following drawings in which like reference numerals refer to like elements wherein:

FIGS. 3a and 3b show a thrice vertical-zoomed operation in accordance with the present invention;

FIGS. 4a and 4b show a storage and process procedure for input Y data in a line memory unit of FIG. 2;

FIG. 10 is a block diagram showing another embodiment of a data processor of FIG. 2.

DETAILED DESCRIPTION OF PREFERRED EMBODIMENT

Reference will now be made in detail to the preferred embodiments of the present invention, examples of which are illustrated in the accompanying drawings.

Generally, the present invention provides an additional function in a digital TV. Namely, an area interested by a user can be zoomed by various magnifications, and then only an interested portion of a zoomed image can be re-zoomed several times, to thereby allow a user-friendly device. Also, the present invention focuses on vertically zooming an image. Therefore, the image may be horizontally zoomed using any method in the prior art, such as registers.

Figure 1:
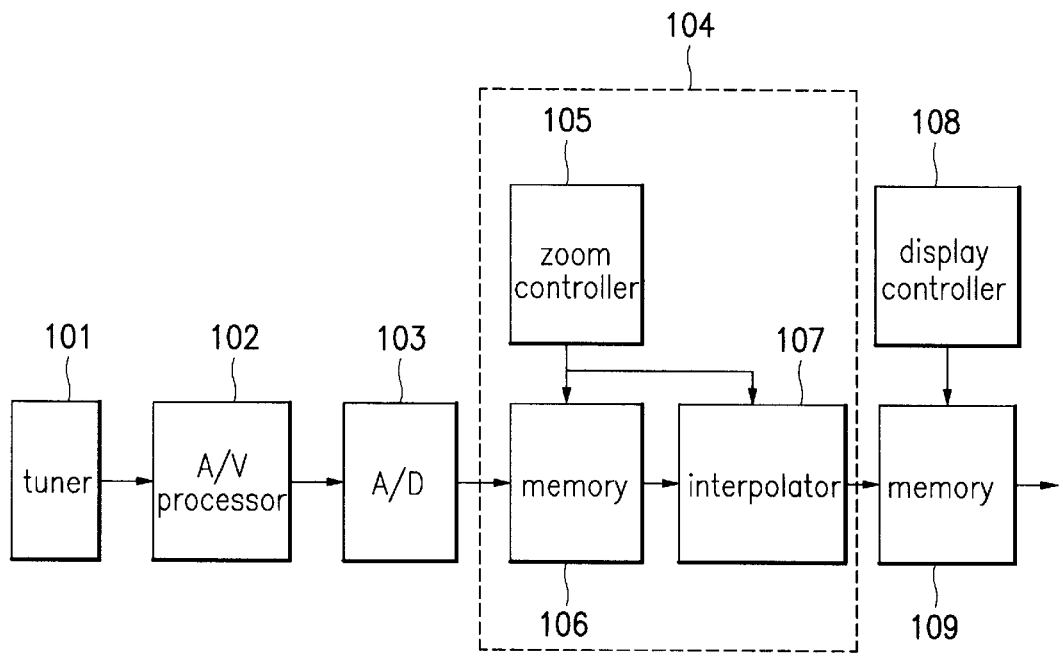
FIG. 1 is a block diagram of an image zooming apparatus in the related art.
Figure 2:
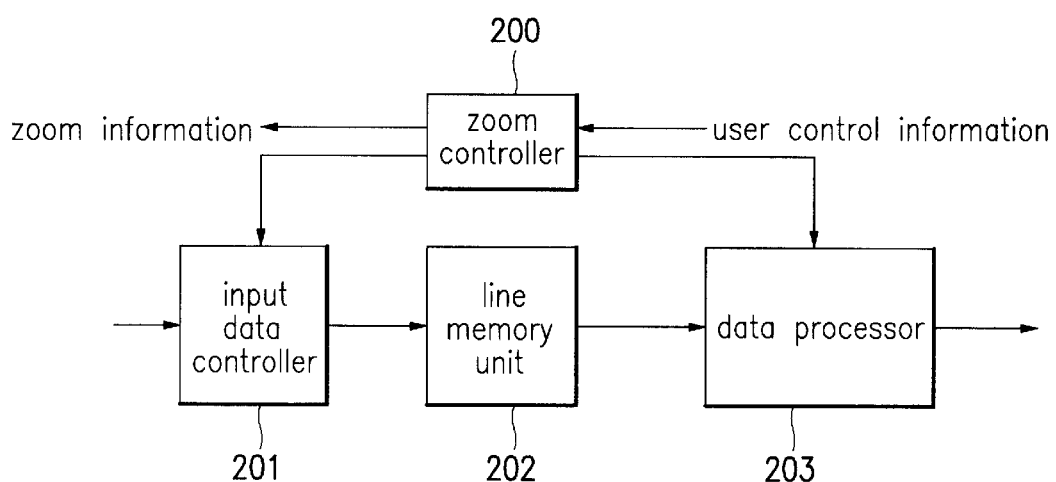
FIG. 2 is a block diagram of an apparatus for zooming an image in a digitaply in accordance with an embodiment of the present invention.

FIG. 2 is a block diagram of a vertically zooming apparatus in a digital TV in accordance with the present invention. The vertically zooming apparatus includes a line memory unit 202 which is constructed by at least one line memory and which stores input images by each line; an input data controller 201 which stores input data in the line memory unit 202 according to the image type and zoom magnification; a zoom controller 200 which controls the storage of data in the line memory unit 202, the zoom area information and zoom magnification, and outputs control signals to the input data controller 201; and a data processor 203 which produces zoomed images.

In the present invention, several number of line memories are used to convert an input image into output images of various types and sizes, based upon a desired format. However, if one line memory is used, a line doubling is applied. If two line memories are used, a linear interpolation is applied, and if three line memories are used, an interpolation of a high level such as a cubic spline algorithm for controlling a weighted value can be applied. In the preferred embodiment, five line memories are used which requires interpolation of a higher level.

Referring back to FIG. 2, the input data controller 201 stores the input data in the line memory unit 202 according to the zoom magnification and type of the input image as provided from the zoom controller 200. Here, the input image type may correspond to an Advanced Television (ATV), a National Television Standards Committee (NTSC) or a Video Graphics Array (VGA). Also, the storage procedure of the luminance (Y) data in the line memory is determined according to a size of the input image and the zoom magnification, regardless of the input image type. However, the storage procedure of the color (C) data in the line memory may differ according to a size and the magnification of the input image, and to the input image type and a color format of an output image.

For example, FIGS. 3(a) and (b) show a conversion from a 4:2:0 ATV data to a 4:2:2 ATV data by triple magnification in the vertical direction. Thereafter, the 4:2:2 ATV data would be magnified in the horizontal direction to 4:4:4 ATV data for display. The ratios 4:2:2, 4:2:0 and 4:4:4 each represent sampling frequency ratio of three elements for luminance information Y, the color difference informations Cb and Cr contained in a transversal scanning line of a TV screen. Namely, color information is often reduced for transmission because human eye is not greatly sensitive to a color. Thus, 4:4:4 represents when the color information is not reduced, 4:2:2 represents when the color information is reduced by half in a transversal direction, and 4:2:0 represents when the color information is reduced by half in both the transversal and length directions.

In FIGS. 3(a) and (b), a solid line represents the original image data Y and a dotted line represents an interpolated image data Y. The interpolated Y data may be obtained using the neighboring original image data Y. The color data may similarly be obtained using neighboring original image data C, where a circle represents the color data C of the original image and a square represents a color data C of the interpolated image. Particularly, FIG. 3 shows a case when an original image having a sampling frequency ratio of 4:2:0 for the luminance information Y and the color difference information Cb and Cr is interpolated into a ratio of 4:4:4 to match the output format. At this time, the luminance signal and color signal are sampled at the same position.

For purposes of explanation, the present invention will be described for a line memory unit having two line memories. FIGS. 4(a) and (b) show a procedure of storing the input image data Y in the line memory unit to execute an interpolation which results in a 3:8 ratio of input pixel number to the output pixel number. A repeated performance of a Finite state machine (FSM) is provided through six steps and an initial step.

In the initial state, a first line of the Y data a is stored in a first line memory 401, and the data stored in the line memory 401 is output as a first line of the interpolation data. In state-1, a second line of the Y data b is stored in a second line memory 402. At this time, both the two line memories 401 and 402 have stored data. The data is maintained in state-2 and state-3. Thus, a second line and the third line of the interpolation data are respectively obtained in state-1 and state 2 by interpolating the data stored in the two line memories 401 and 402, i.e. a and b. In state-3, the data stored in line memory 402 is output as the fourth line of the interpolation data.

In state-4, a third line of the Y data c is stored in the line memory 401. In other words, a first line of the Y data a stored in the line memory 401 is erased or replaced by a new data. Thereafter, the data is maintained in state-5 and state-6. Accordingly, a fifth and sixth lines of the interpolation data are respectively obtained in state-4 and state 5 by interpolating the data stored in the two line memories 401 and 402, i.e. b and c. In state-6, the data stored in line memory 401 is output as the seventh line of the interpolation data and the process returns to state-1 to store a new Y data, i.e. a fourth line of the Y data, in the line memory 402. Therefore, the FSM has six steps which is repeatedly executed.

Figure 5:
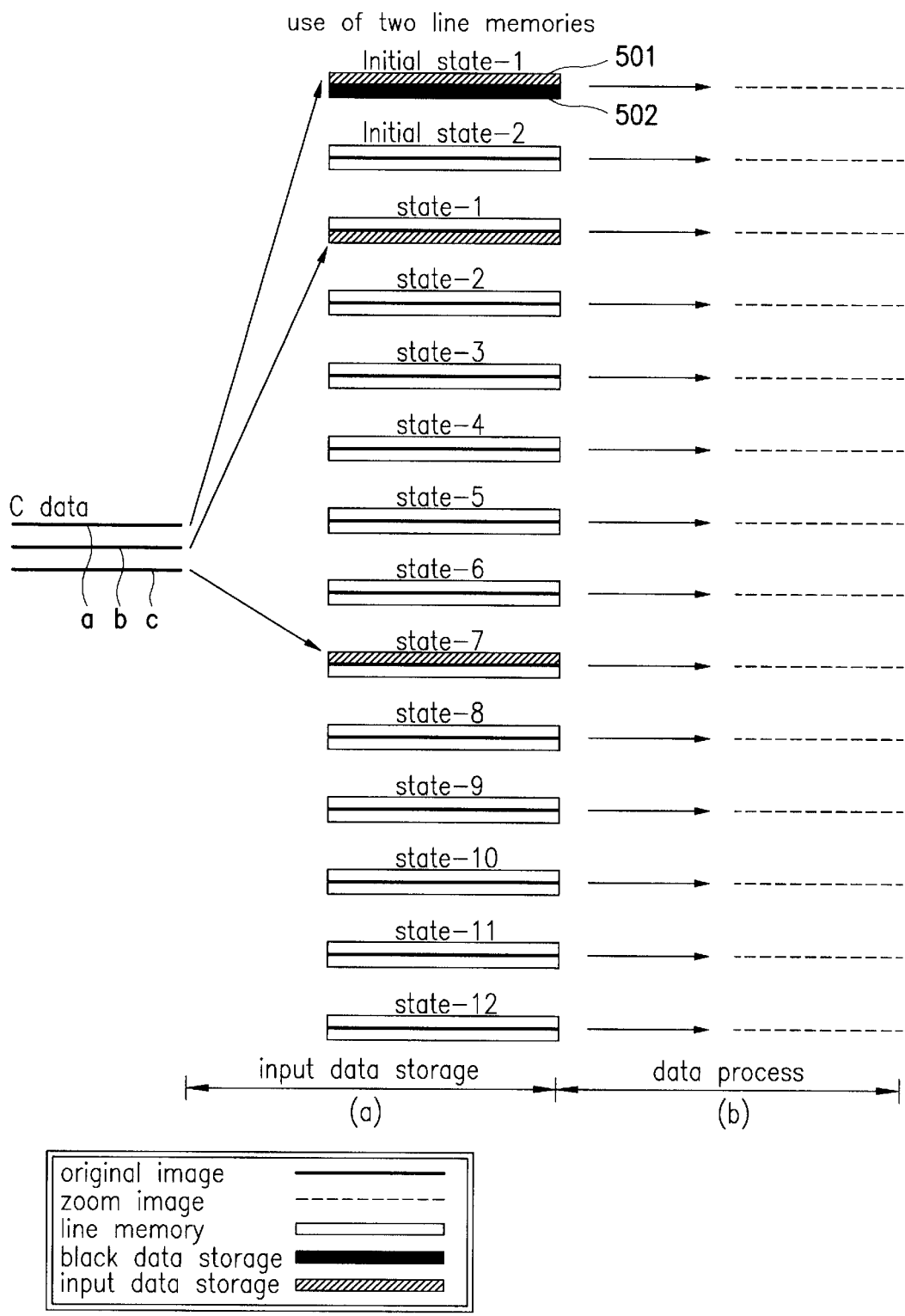
FIGS. 5a and 5b show a storage and process procedure for input C data in a line memory unit of FIG. 2.

FIGS. 5(a) and (b) show a procedure for zooming the C data though linear interpolation using the two line memories. Since there are only half of C data in comparison to the Y data, the number of sampling or number of stored states doubles the zooming of Y data as shown in FIG. 4. Generally, the number of states in a FSM varies depending upon the magnification. Accordingly, the interpolation data C may be obtained by repeatedly executing a FSM having twelve steps, excluding the initial steps. However, the operation is similar to the FSM explained with reference to FIG. 4.

Particularly, when zooming the color data C, a black data is used. Referring back to FIG. 3, because there is no original color data C in the positions of luminance data Y0 and Y7, the black data is used to obtain an interpolated data which results in a 3:16 ratio of input pixel number to the output pixel number. Therefore, in Initial state-1 of FIG. 5, a first line of the C data is stored in a first line memory 501 and a black data is stored in a second line memory 502, and the stored data is maintained to Initial state-2. Accordingly, the first and second line of the interpolated data may be obtained by interpolating the data stored in the two line memories 501 and 501.

Subsequently, in state-1, a second line of the C data replaces the black data stored in the line memory 502 and in state-7, a third line of the C data replaces the first line of the C data stored in the line memory 501. Thus, in state-1, the second line of the C data is stored in the line memory 502 and in state-1 through state 6, lines of interpolated data may be obtained by interpolating the first and second lines of the C data. Similarly, in state-7, the third line of the C data is stored in the line memory 501 and in state-7 through state 12, lines of interpolated data may be obtained by interpolating the second and third lines of the C data. Thereafter, the process returns to state-1 to store a new C data, i.e. a fourth line of the C data, in the line memory 502.

Referring back to FIG. 2, the zoom controller 200 controls the data storage in the line memory unit 202 as described above, the zoom area information, and the zoom magnification through a selection by a user. Namely, the user may determine a position to be zoomed from the output image. In response, the zoom controller 200 determines a zooming start position on the original image and an input size according to the magnification and the position determined by the user.

If a zoom function is selected to output a zoomed image of a high definition (HD) format from an original image of HD format or to output a zoomed image of a standard definition (SD) format from an original image of SD format, a portion of the original image on the display screen is simply zoomed. In contrast, if the zoom function is selected to output a zoomed image of a SD format from an original image of a HD format, a portion of the original image on the display screen is zoomed by a different down sampling ratio. Namely, the down sampling is performed, but by a different ratio.

Figure 6:
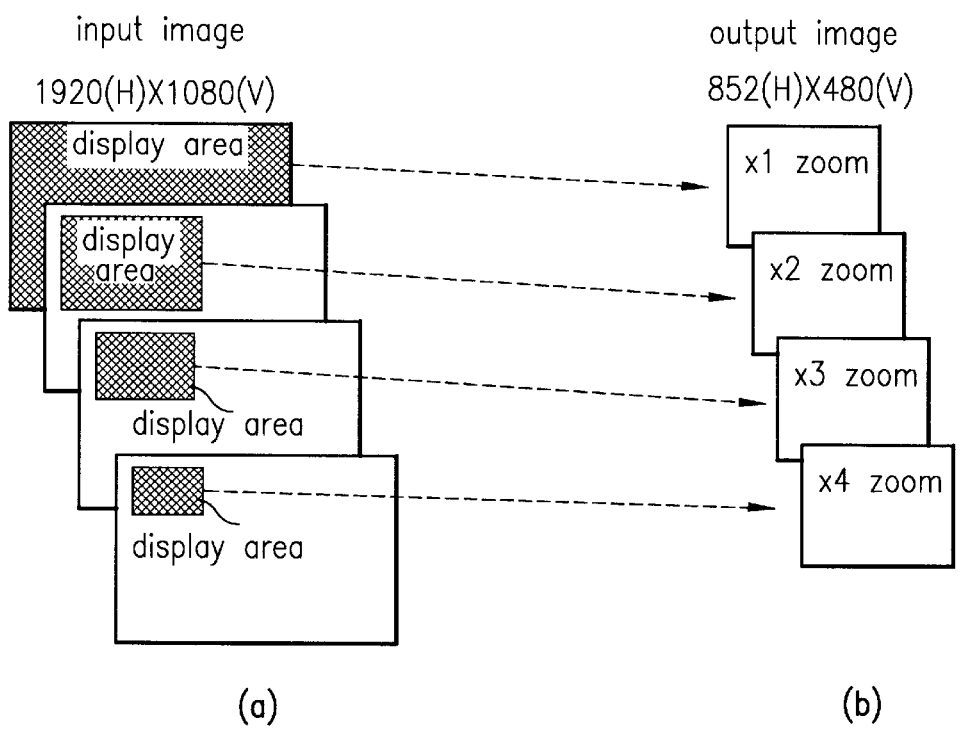
FIGS. 6a and 6b illustrate a zooming area determination system of an original image in accordance with the present invention.

FIGS. 6(a) and (b) show an output image of 16:9 SD size from an image of the HD format, and show the defined states of zooming area in the original image. Namely, a portion of an original image is displayed on the overall screen according to the zoom magnification.

Generally, when a zooming of an area is not performed, the original image having a size of 1920(H)×1080(V) as shown in FIG. 6(a) is down sampled into an image having a size of 852(H)×480(V) as shown in FIG. 6(b), and then is output. However, when an image is zoomed by a magnification of two times respectively in width and length, a ¼ times a size of the-original image, i.e. 960(H)×540(V), is output to an image having a size of 852(H)×480(V), based upon a starting point decided by the user. Therefore, when zooming by n magnification respectively in both width and length through the above method, a 1/n size of an original image is converted into a size of an output image.

The starting point of the zooming position, decided by the user, is based upon the output image. Accordingly, a conversion procedure of the starting point is required in order to determine a zoom starting position of the original image.

Figure 7:
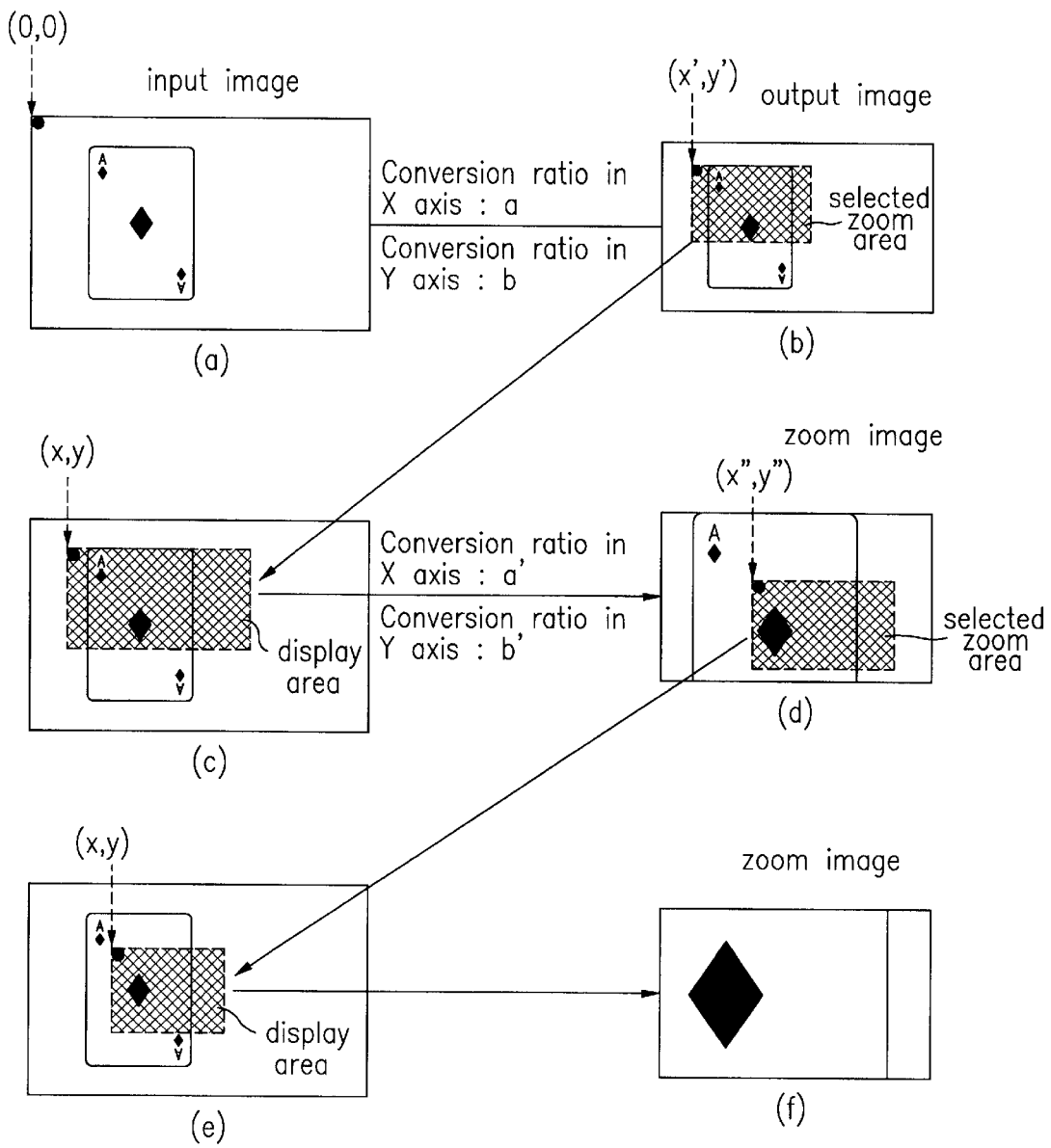
FIGS. 7a through 7f show a zooming procedure of an output image and a re-zooming procedure of the zoomed image in accordance with the present invention.

FIG. 7 shows an example where an original image as shown in FIG. 7(a) is converted into an output image shown in FIG. 7(b) by a down sampling. Here, the original image is down sampled by multiplying the x-axis by a value of a and multiplying the y-axis by a value of b. Generally, FIGS. 7(a), 7(c) and 7(e) represent an input image and FIGS. 7(b), 7(d), and 7(f) show a displayed output image. When an area on a displayed output image is zoomed by four times, namely twice in width and twice in length, ¼ of the original image is converted into the output image, and a starting point of an image may be determined as follows. an input image and FIGS. 7(b), (d), and (f) show a displayed output image. When an area on a displayed output image is zoomed by four times, namely twice in width and twice in length, ¼ of the original image is converted into the output image, and a starting point of an image may be determined as follows.

If the coordinates of a top left pixel of the original image is (0, 0) as shown in FIG. 7(a), the zoom area starting point of the displayed output image selected by the user is (x', y') as shown in FIG. 7(b). At this time, if the coordinates of the original image corresponding to (x',y') is (x, y) as shown in FIG. 7(c), a relation between the two coordinates may be represented by Equation 1.

$$x \cong \frac{1}{a}x' \quad y \cong \frac{1}{b}y' \tag{1}$$

Similarly, a portion of the zoomed area may be re-zoomed by the user. In this case, when an area on a zoomed output image is again zoomed by four times, 1/16 of the original image is converted into the output image. Also, a relation between an image starting point (x", y") in the re-zoomed image as shown in FIG. 7(d) and corresponding coordinates (x, y) of the original image as shown in FIG. 7(e), may be represented by Equation 2, in consideration of a' of the x axis and b' of the y axis in a conversion ratio of a previous zoom.

$$x \cong \frac{1}{a'}x'' + x_{\text{previous val.}} \quad y \cong \frac{1}{b'}y'' + y_{\text{previous val.}} \tag{2}$$

In Equation [2], the value of $X_{previous\ val.}$ and $Y_{previous\ val.}$ indicate the starting point on the original image in a previous zooming step. That is, the starting point position of the original image is inversely calculated from the starting position of the output image, and an area to be actually zoomed is determined by a multiplication of total magnification respect to the original image. FIG. 7(f) shows an example of a further zoomed image. Although an image may be zoomed a multiple times using the above method, a maximum magnification and the minimum magnification may be restricted in consideration of a size and design of the hardware.

Figure 8:
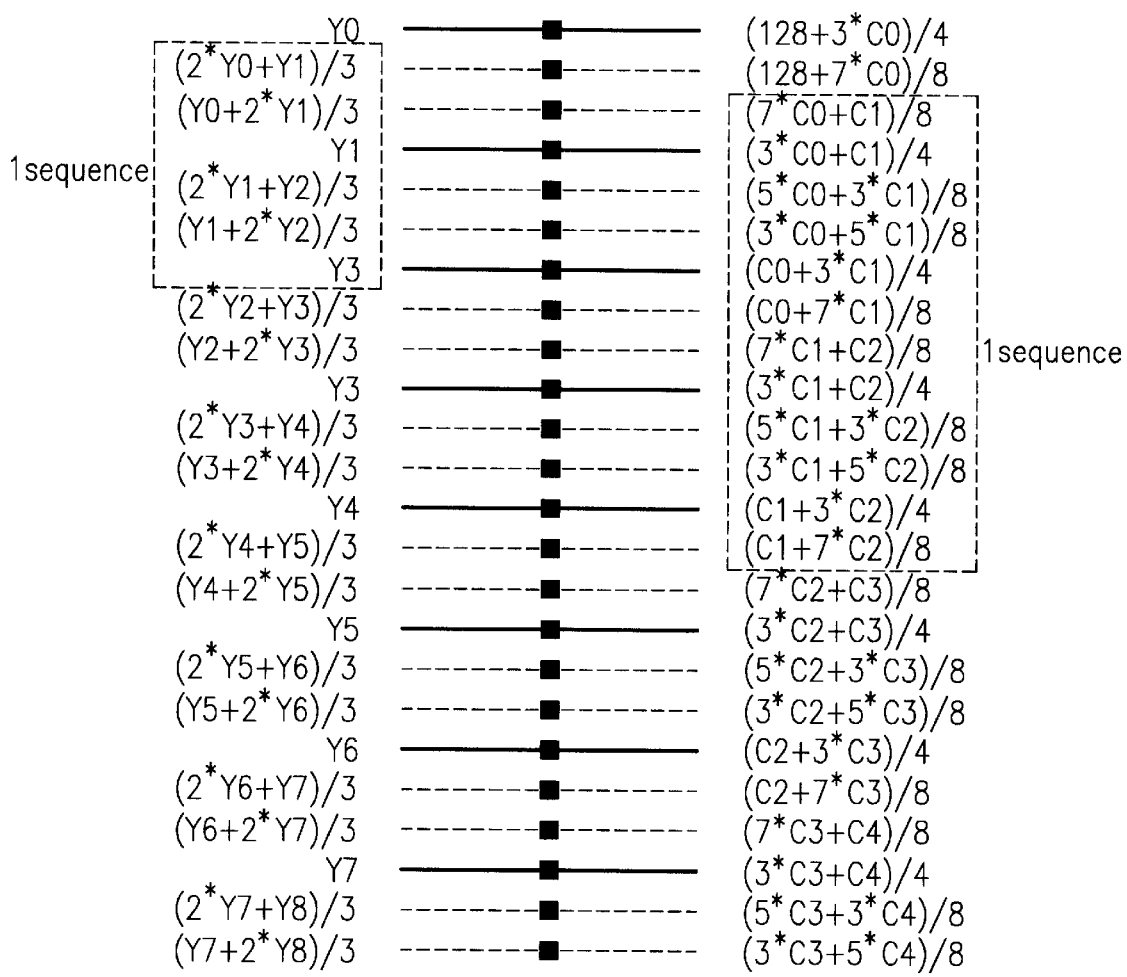
FIG. 8 shows an operational expression for a vertical line combination executed in a data processor of FIG. 2.

To obtain a zoomed image as shown in FIG. 3, the data processor 203 of FIG. 2 combines the data lines stored in the line memory unit 202. Namely, a vertical line combination using a lineat interpolation may be executed as shown in FIG. 8. Here, the left side provides the interpolation expressings for the Y data and the right side provides the interpolation expressions for the C data, where the first sequence indicate the zooming process explained with reference to FIGS. 4 and 5.

Figure 9:
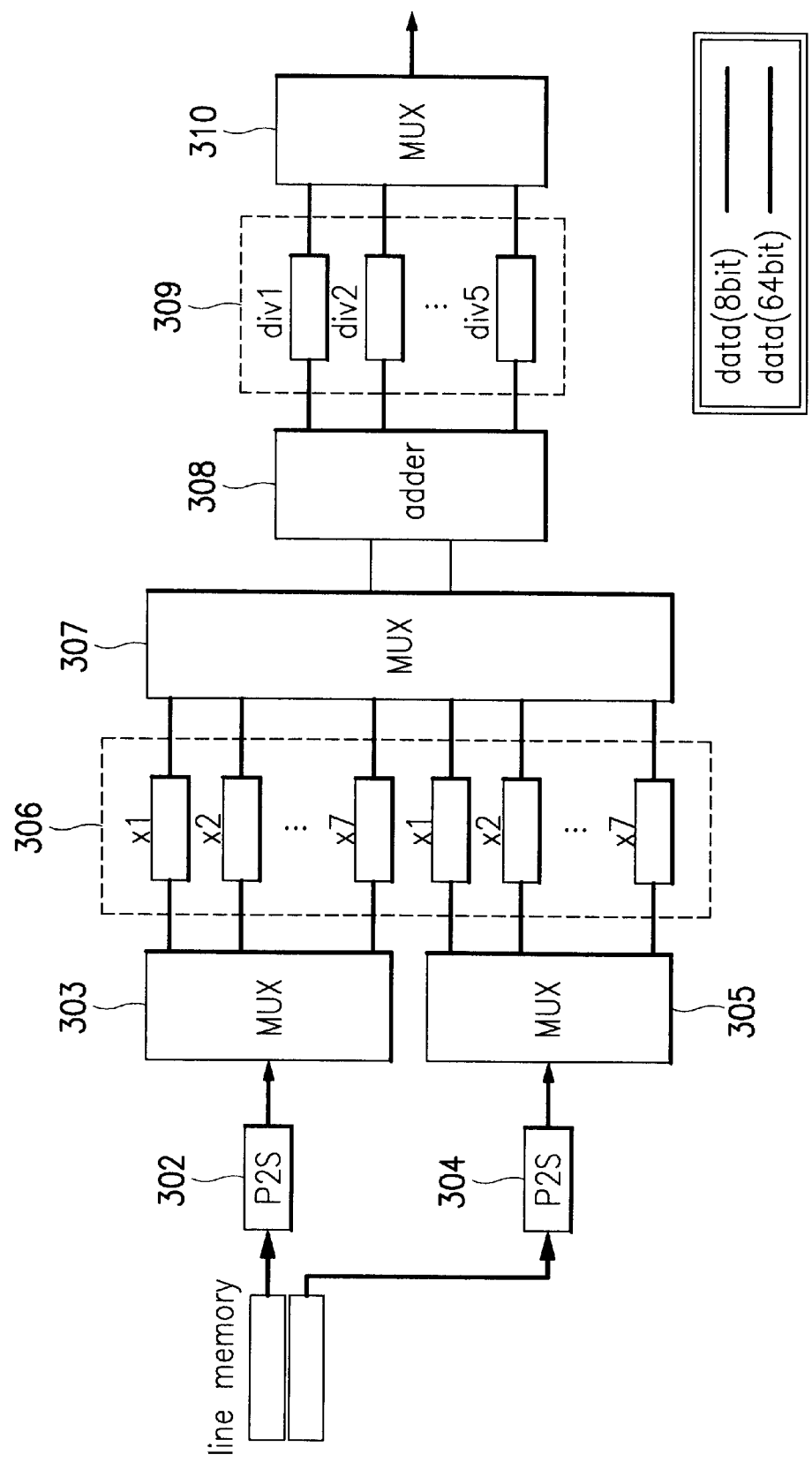
FIG. 9 is a block diagram showing one embodiment of a data processor of FIG. 2.

Particularly, FIG. 9 shows a structure of the data processor 203 for a line memory unit 202 having two line memories. The data processor 203 includes parallel to series converter (P2S) 302 and 304; 8bit input multiplexers 303 and 305; 8 bit multiplexers 307 and 310; an adder 308; a multiplication assembly 306; and a divider assembly 309, all operatively coupled. The multiplication assembly 306 further includes a number of multipliers x1~x7 and the divider assembly 309 further includes a number of dividers div1~div5. Depending upon a maximum zoom magnification required, more multipliers and dividers may respectively be added to the multiplication assembly 306 and the divider assembly 309. Also, there are generally a number of input multiplexers corresponding to the number of line memories in the line memory unit.

Particularly, each input multiplexer 303 and 305 receives the input image data stored in a corresponding line memory through a P2S and outputs the data to the multiplication assembly 306. The multiplexer 307 then selectively multiplexes the data received through the multipliers in the multiplication assembly 306, according to the zoom magnification. Thereafter, the adder 308 adds the multiplexed data and outputs a data sum to the divider assembly 309. Finally, the multiplexer 310 selectively outputs a data sum divided through one of the dividers in the divider assembly 309 as a zoomed data.

For example, to combine the original Y data to obtain the first sequence as shown in FIG. 8, two multipliers x1 and x2, and a divider div3 would be required. On the other hand, four multipliers {x1, x3, x5, x7} and two dividers {div4, div8} are required to combine the original C data into the first sequence. Thus, the data processor 203 shown in FIG. 9 simply embodies the zooming logic according to the operational expressions of FIG. 8. As a result, the circuit may become complicated when numerous multipliers and dividers are required.

Therefore, FIG. 10 shows an alternative embodiment of the data processor 203 using the existing vertical filter logic. The second embodiment of the data processor 203 includes P2S 402, a vertical filter 403, a switch 405, and a coefficient set 404. Here, the vertical filter 403 is used if the input image is relatively larger than the output image. This system has a more simplified hardware construction because a coefficient of the filter is added without a specific zoom logic as in the data processor 203 of FIG. 9. Particularly, a filter coefficient for a zoom is switched by the switch 405 according to a line memory position of the input image, and is loaded onto the vertical filter 403 from the coefficient set 404. In this embodiment, the number of line memories varies according to the number of taps in the vertical filter 403.

For example, to combine the original Y data to obtain the first sequence as shown in FIG. 8, coefficients of (0, 1) and (1/3, 2/3) would be required. Similarly, to combine the original C data to obtain the first sequence, coefficients (1/3, 3/4), (1/8, 7/8), and (3/8, 5/8) are required.

As described above, in the image zooming apparatus and method for a digital TV according to the present invention, a user may zoom and watch an image area of interest, where the zooming can be of various magnifications. Also, an area of a zoomed image may further be re-zoomed. Finally, the present zooming function can be implemented in a digital TV using a format converter and display equipment. Therefore, the present apparatus may be implemented in the existing structure without significantly adding more hardware, thereby reducing the manufacturing cost.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A vertical zooming apparatus for an image comprising:
   a line memory unit which includes at least one line memory and which stores input image data by each memory line;
   an input data controller which stores the input image data in the line memory unit according to the image type and zoom magnification;
   a zoom controller which receives an area information to be zoomed and a zoom magnification from a user, said zoom controller controlling the storage of the input image data in the line memory unit by outputting a first control signal to the data controller and controlling the processing of the stored data; and
   a data processor which produces a zoomed image using the stored image data in the line memory unit, according to the control of the zoom controller, wherein said data processor includes,
   a multiplication assembly including at least one multiplier,
   a divider assembly including at least one divider,
   a plurality of first multiplexers corresponding to the number of line memories in the line memory unit, each multiplexer receiving the input image data stored in a corresponding the line memory and outputting the received data to one of said multipliers,
   a second multiplexer selectively multiplexing the input image data through said at least one of the multipliers, according to the zoom magnification, and outputting multiplexed data,
   an adder adding the multiplexed data and outputting data sum to the divider assembly, and
   a third multiplexer selectively outputting a data sum divided through one of said at least one divider as a zoomed data.

2. An apparatus of claim 1, wherein the data processor produces the zoomed image by an interpolation of the stored image data.

3. An apparatus of claim 2, wherein the interpolation method depends upon a number of line memories in the line memory unit.

4. An apparatus of claim 3, wherein a line doubling is used when the line memory unit has one line memories, a linear interpolation is used when the line memory unit has two line memories, and an interpolation of a high level is used when the line memory unit has three line memories.

5. An apparatus of claim 1, wherein the input data controller stores a luminance (Y) data in the line memory according to a size and zoom magnification of the input image, regardless of the input image type.

6. An apparatus of claim 1, wherein the input data controller stores a color (C) data in the line memory according to a size and zoom magnification of the input image, and according to an input image type and a color format of an output image.

7. An apparatus of claim 1, wherein the input data controller stores the input image data in the line memory unit through a repeated performance of a finite state machine of a given number of steps.

8. An apparatus of claim 1, wherein the data processor comprises:
   a coefficient set having a plurality of coefficients;
   a switch outputting a filter coefficient from the coefficient set based upon a line memory position of the input image data stored in the line memory unit; and
   a vertical filter producing a zoomed image by combining the input image data stored in line memories of the line memory unit using the filter coefficient.

9. In a digital television system, a vertical zooming method for an input image, the method comprising:
   (a) storing non-correspondingly lines of input image data into a plurality of line memories of a line memory unit according to the input image type having different display format and zoom magnification;
   (b) receiving an area information to be zoomed and a zoom magnification from a user, and controlling the storage of the input image data in the line memory unit and controlling the processing of the stored data; and
   (c) producing a zoomed image using the stored image data in the line memory unit, according to the control in the step (b).

10. A method of claim 9, wherein in the step (c), the zoomed image is produced by an interpolation of the stored image data.

11. A method of claim 10, wherein the interpolation process varies depending upon a number of line memories present in the line memory unit.

12. A method of claim 11, wherein the step (c) uses a line doubling interpretation when the line memory unit has one line memory, a linear interpolation when the line memory unit has two line memories, and an interpolation of a high level when the line memory unit has three line memories.

13. A method of claim 9, wherein the step (a) stores a luminance (Y) data in the line memory unit according to a size and zoom magnification of the input image, regardless of the input image type.

14. A method of claim 9, wherein the step (a) stores a color data in the line memory unit according to a size and zoom magnification of the input image, and according to an input image type and a color format of an output image.

15. A method of claim 9, wherein the step (a) stores the input image data in the line memory unit through a repeated performance of a finite state machine of a given number of steps.

16. A method of claim 9, wherein the step (c) comprises:

storing a plurality of coefficients;

outputting a filter coefficient from the plurality of coefficients based upon a line memory position of the input image data stored in the line memory unit; and producing a zoomed image through a vertical filter by combining the input image data stored in the line memories of the line memory unit using the filter coefficient.

17. A digital TV comprising:

a line memory unit which includes at least one line memory and which stores input image data by each memory line;

an input data controller which stores the input image data in the line memory unit according to the image type and zoom magnification;

a zoom controller which receives an area information to be zoomed and a zoom magnification from a user, said zoom controller controlling the storage of the input image data in the line memory unit by outputting a first control signal to the data controller and controlling the processing of the stored data, a data processor which produces a vertically zoomed image using the stored image data in the line memory unit, according to the control of the zoom controller, wherein said data processor includes, a multiplication assembly including at least one multiplier, a divider assembly including at least one divider, a plurality of first multiplexers corresponding to the number of line memories in the line memory unit, each multiplexer receiving the input image data stored in a corresponding the line memory and outputting the received data to one of said multipliers, a second multiplexer selectively multiplexing the input image data through said at least one of the multipliers, according to the zoom magnification, and outputting multiplexed data, an adder adding the multiplexed data and outputting data sum to the divider assembly, and a third multiplexer selectively outputting a data sum divided through one of said at least one divider as a zoomed data.

18. An apparatus of claim 17, wherein the data processor produces the zoomed image by an interpolation of the stored image data.

19. An apparatus of claim 17, wherein the data processor comprises:

a coefficient set having a plurality of coefficients;

a switch outputting a filter coefficient from the coefficient set based upon a line memory position of the input image data stored in the line memory unit; and a vertical filter producing a zoomed image by combining the input image data stored in line memories of the line memory unit using the filter coefficient.

* * * * *